(12) United States Patent
Schoeberl

(10) Patent No.: US 10,783,350 B2
(45) Date of Patent: Sep. 22, 2020

(54) METHOD AND DEVICE FOR CONTROLLING A DRIVER ASSISTANCE SYSTEM BY USING A STEREO CAMERA SYSTEM INCLUDING A FIRST AND A SECOND CAMERA

(71) Applicant: Robert Bosch GmbH, Stuttgart (DE)

(72) Inventor: Thomas Schoeberl, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 122 days.

(21) Appl. No.: 16/142,930

(22) Filed: Sep. 26, 2018

(65) Prior Publication Data

US 2019/0095693 A1    Mar. 28, 2019

(30) Foreign Application Priority Data

Sep. 27, 2017   (DE) .................. 10 2017 217 140

(51) Int. Cl.
| | |
|---|---|
| *G06K 9/00* | (2006.01) |
| *G06K 9/46* | (2006.01) |
| *B60W 30/08* | (2012.01) |
| *H04N 13/239* | (2018.01) |
| *B60R 1/00* | (2006.01) |
| *H04N 13/00* | (2018.01) |

(52) U.S. Cl.
CPC ............ *G06K 9/00208* (2013.01); *B60R 1/00* (2013.01); *B60W 30/08* (2013.01); *G06K 9/00201* (2013.01); *G06K 9/00791* (2013.01); *G06K 9/4604* (2013.01); *H04N 13/239* (2018.05); *B60R 2300/107* (2013.01); *B60R 2300/303* (2013.01); *H04N 2013/0081* (2013.01)

(58) Field of Classification Search
CPC ........... G06K 9/00791; G06K 9/00241; G06K 9/6202; G06K 9/00208; G06K 9/00214; H04N 13/211; H04N 13/239; H04N 13/254; H04N 13/296
See application file for complete search history.

(56) References Cited

U.S. PATENT DOCUMENTS

| 9,672,635 | B2 * | 6/2017 | Einecke | ............. G06K 9/00791 |
| 2015/0199818 | A1 * | 7/2015 | Einecke | ............. G06K 9/00791 |
| | | | | 382/104 |
| 2019/0095694 | A1 * | 3/2019 | Waizenegger | .......... G06T 7/536 |
| 2020/0092533 | A1 * | 3/2020 | Narasimhan | .......... G01S 17/894 |

* cited by examiner

*Primary Examiner* — Diane D Mizrahi
(74) *Attorney, Agent, or Firm* — Norton Rose Fulbright US LLP; Gerard Messina

(57) ABSTRACT

A method for controlling a driver assistance system by using a stereo camera system having a first and a second camera, the method having a step of reading in, a first image being read in from the first camera and a second image being read in from the second camera. The method furthermore comprises a step of forming, a cost function being generated by using the first and the second image. Furthermore, in a further method step of determining, a frontoparallelity parameter representing the frontoparallelity of an object with respect to the stereo camera system is determined by using a global minimum of the cost function. Finally, the method comprises a step of using, the frontoparallelity parameter being used to control the driver assistance system.

12 Claims, 5 Drawing Sheets

METHOD AND DEVICE FOR CONTROLLING A DRIVER ASSISTANCE SYSTEM BY USING A STEREO CAMERA SYSTEM INCLUDING A FIRST AND A SECOND CAMERA

CROSS REFERENCE

The present application claims the benefit under 35 U.S.C. § 119 of German Patent Application No. DE 102017217140.5 filed on Sep. 27, 2017, which is expressly incorporated herein it its entirety.

FIELD

The present invention relates to a device and a method for controlling a driver assistance system. A computer program is also a subject matter of the present invention.

BACKGROUND INFORMATION

Stereo camera systems made up of two identical cameras directed to the same target objects are increasingly used for observing the surroundings in particular for driver assistance systems since it is possible thereby to ascertain the distance of objects via the perspective representation of the two camera images.

SUMMARY

The present invention provides an example method for controlling a driver assistance system by using a stereo camera system including a first and a second camera, furthermore a device using this method, and, finally, a corresponding computer program product. As a result of the measures described herein, advantageous refinements and improvements of the device are possible.

An example method is provided for controlling a driver assistance system by using a stereo camera system having a first and a second camera, the method comprising the following steps:

reading in a first image from the first camera and a second image from the second camera;

forming a cost function by using the first and the second image;

determining a frontoparallelity parameter representing the frontoparallelity parameter of an object with respect to the stereo camera system by using a global minimum of the cost function; and using the frontoparallelity parameter for controlling the driver assistance system.

The driver assistance system may be an electronic supplementary device in a vehicle for supporting the driver in specific driving situations. For this purpose, it is possible to perform or output interventions and/or indications regarding vehicle safety, but also increasing the driving comfort for the driver and additional vehicle occupants in the foreground. The stereo camera system may be a camera system that has at least two objective lenses mounted side-by-side and is therefore able to record stereoscopic images. A cost function may be understood as a value that is calculated using a functional correlation that represents disparities along the associated epipolar line as well as a depth distance. A cost function may thus represent a relationship between the virtual costs for example of all disparities possible for a pixel of a base image along the associated epipolar line as well as a depth distance. A frontoparallelity may describe a state in which both a camera as well as the object to be imaged by the camera are oriented parallel to each other on a frontal plane. A frontoparallelity parameter may represent a measure or a variable of the frontoparallelity. A global minimum of the cost function may describe a disparity with a minimum extreme value of the cost function. For example, the functional value of the cost function at the global minimum may be the smallest functional value at least for a small region around this point for smaller and greater values of a disparity represented on an x axis.

Embodiments of the present invention are based on the recognition that using the cost function makes it possible to ascertain a global minimum in technically simple fashion, which then provides a sound indication of the reciprocal distance of an object from the stereo camera system. In this manner, it is advantageously possible to implement or realize a low-error method of ascertaining the actual distance and/or the orientation of an object in front of the stereo camera system in order thereby to be able to perform an evaluation of the surroundings in front of the vehicle and advantageously to control a driver assistance system.

According to one specific embodiment, in the step of forming, it is possible to compare a subsection of the first camera image to at least one further subsection of the second camera image, a row of the first camera image in particular being compared to a row of the second camera image and/or a column of the first camera image being compared to a column of the second camera image. Advantageously, it is possible to process subsections by rows and/or by columns, which is technically quick and simple to implement.

According to one specific embodiment, in the step of determining, it is possible to determine the cost function as a function of a disparity parameter representing the distance of the object from the stereo camera system. When applying such a specific embodiment of the method to a stereo camera system for road scenarios, violations of the frontoparallelity in the case of roadway markings and also guardrails are readily detected. Such a specific embodiment of the method is thus also suitable for identifying the position of roadway markings and guardrails. Such a specific embodiment of the method is also suitable generally for detecting the frontoparallelity of objects in stereo systems and is not limited to cameras for driver assistance systems.

According to one specific embodiment of the present invention, in the step of determining, it is possible to use the disparity parameter, which represents a reciprocal measure of the distance of the object from the stereo camera system. Since in accordance with such a specific embodiment there exists an inversely proportional dependence between the depth distance and the disparity, this has the result of making it possible to achieve a high depth resolution of an object only in close surroundings of the camera.

According to one specific embodiment of the present invention, in the step of determining, it is possible to determine at least two maxima of the cost function, a disparity parameter associated with the global minimum lying between disparity parameters that are associated with the two maxima. Since the disparity calculation is computationally intensive, preferably simple and fast algorithms are used so as not to increase the computational work unnecessarily when checking the frontoparallelity. Advantageously, it is normally possible to ascertain the global minimum simply by running through the disparity curve from left to right, i.e., when ascertaining the cost function values without computationally intensive jumps to different cost function values.

According to one specific embodiment of the present invention, in the step of determining, a difference of the disparity parameters, which are associated with the two maxima, may be greater than a disparity parameter threshold value. Such a specific embodiment offers the advantage of achieving a high degree of interference resistance against noise by using the disparity parameter threshold value.

According to one specific embodiment of the present invention, in the step of determining, a cost function comparison value, which is formed by combining the cost function at the global minimum and at least one of the maxima, may be greater than a cost function threshold value. Such a specific embodiment offers the advantage of a reliable detection of the existence of a frontoparallelity since it is possible efficiently to compensate for or at least minimize interfering influences in such a detection. Thus, it is possible, for example, to determine two variables as a measure for the frontoparallelity. For these two variables of the frontoparallelity, it is possible to perform a comparison of merely two threshold values.

According to one specific embodiment of the present invention, in the step of determining, it is possible to form the cost function comparison value by a sum of a cost function value of each of the maxima, minus the value of the cost function or a value of the cost function at the global minimum multiplied by a factor, in particular by the factor of 2. Such a specific embodiment of the approach provided here offers the advantage of allowing for a simple determination of the cost function comparison value, which at the same time allows for a highly meaningful statement regarding the existence of a frontoparallelity at low interference effects.

According to one specific embodiment of the present invention, in the step of determining, it is possible to form the frontoparallelity parameter as a bit value. A bit value allows for the binary storage of the frontoparallelity parameter, for example by the value 1, if an existence of a frontoparallelity of the object in relation to the stereo camera system was determined, or by the value 0, if no existence of a frontoparallelity of the object was determined in relation to the stereo camera system. By reproducing the frontoparallelity parameter as a bit value, it requires only little memory space, may be transmitted quickly and can also be readily evaluated in other functions.

This method may be implemented for example in software or hardware or in a mixed form of software and hardware, for example in a control unit.

The present invention also provides an example device which is developed to carry out, control or implement the steps of a variant of a method provided here in corresponding devices. This variant of an embodiment of the present invention in the form of a device is also able to achieve the objective of the present invention quickly and efficiently.

For this purpose, the device may include at least one processing unit for processing signals or data, at least one memory unit for storing signals or data, at least one interface to a sensor or an actuator for reading in sensor signals from the sensor or for outputting data signals or control signals to the actuator and/or at least one communication interface for reading in or outputting data that are embedded in a communication protocol. The processing unit may be for example a signal processor, a microcontroller or the like, while the memory unit may be a flash memory, and EEPROM or a magnetic memory unit. The communication interface may be designed to read in or output data wirelessly and/or in line-conducted fashion, a communication interface that is able to read in or output line-conducted data being able to read in these data for example electrically or optically from a corresponding data transmission line or output them to a corresponding data transmission line.

In the present case, a device may be understood to refer to an electrical device that processes sensor signals and outputs control signals and/or data signals as a function thereof. The device may include an interface developed in the form of hardware and/or software. In a hardware implementation, the interfaces may be part of a so-called system ASIC, for instance, which encompasses a wide variety of functions of the device. However, it is also possible for the interfaces to be separate, integrated circuits or to be at least partially made up of discrete components. In a software development, the interfaces may be software modules which, for example, are present on a microcontroller in addition to other software modules.

Also advantageous is a computer program product or computer program having program code that may be stored on a machine-readable carrier or memory medium such as a semiconductor memory, a hard-disk memory or an optical memory, and which is used to carry out, implement and/or control the steps of the method according to one of the specific embodiments described above, in particular when the program product or program is executed on a computer or a device.

Exemplary embodiments of the present invention are depicted in the figures and described in greater detail below.

DETAILED DESCRIPTION OF EXAMPLE EMBODIMENTS

Figure 1:
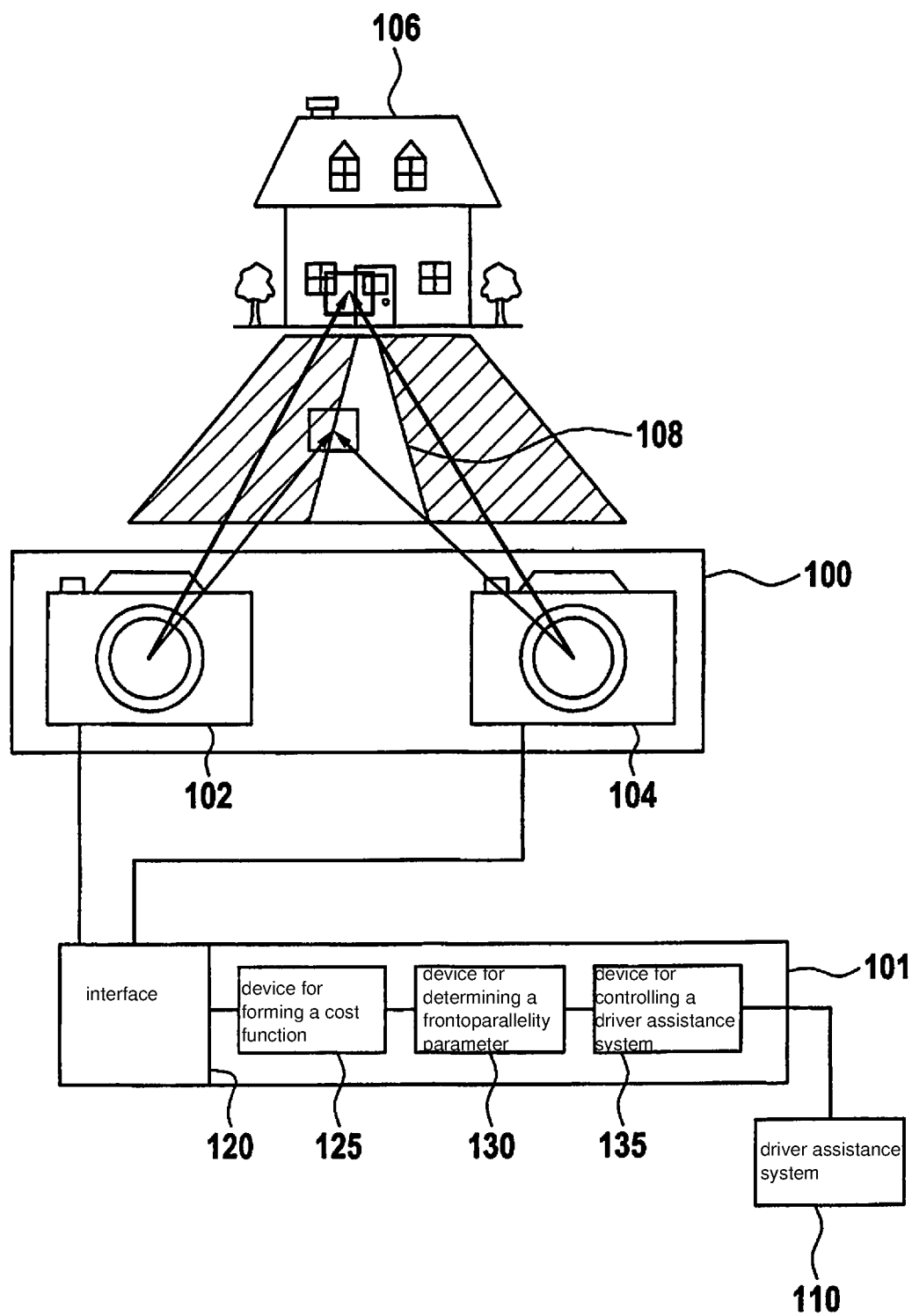
FIG. 1 shows a schematic representation of a stereo camera for use with a device according to one exemplary embodiment of the present invention.

In the description below of advantageous exemplary embodiments of the present invention, identical or similar reference numerals are used for elements shown in the various figures that act similarly, a repeated description of these elements being omitted in this case.

FIG. 1 shows a schematic representation of a stereo camera 100 for use with a device 101 according to one exemplary embodiment.

FIG. 1 shows the example of a stereo camera system 100 made up of two identical cameras 102, 104, each camera 102, 104 being directed to the same target object 106, in this case a house 106, to which a path 108 leads. The two cameras 102, 104 are in this case recording the same scene, that is, house 106, from different spatial standpoints. In this instance, the distance of house 106 from stereo camera system 100 is to be ascertained via a perspective representation of the two camera images. The epipolar geometry here describes the relationship between the two different camera images of the same target object 106. This makes it possible to describe the dependency between the corresponding image points, that is, the points produced by a single object point in the two camera images. Furthermore, aside from the distance of the object as in this case of house 106, the evaluation of the images of the two cameras 102 and 104 is also able to ascertain the frontoparallelity of the object, in this case for example of house 106, as will be described in more detail below. For example, in a segment of the images of the two cameras 102 and 104, respectively, which represent a section of house 106, it is possible to ascertain the orientation of detected edges in the respective images so that from this, it is possible to determine an orientation of the object such as of house 106 in relation to cameras 102 and 104, respectively, of stereo camera system 100. On the other hand, it is also possible to detect from a degree of inclination of the course of detected edges in the area of path 108 that this path 108 does not represent an object that is oriented in a frontoparallel manner relative to the image recording plane of stereo camera system 100.

In order to be able to detect such a frontoparallelity of an object such as house 106, the previously briefly mentioned device 101 controls a driver assistance system 110 by using stereo camera system 100 having the first 102 and the second 104 camera. For this purpose, device 101 comprises an interface 120 for reading in a first image from first camera 102 and a second image from second camera 104. Device 101 furthermore comprises a device 125 for forming a cost function by using the first image and the second image and a device 130 for determining a frontoparallelity parameter representing the frontoparallelity of an object with respect to the stereo camera system by using a global minimum of the cost function. Finally, device 101 comprises a device 135 for outputting or using the frontoparallelity parameter for controlling driver assistance system 110.

Figure 2:
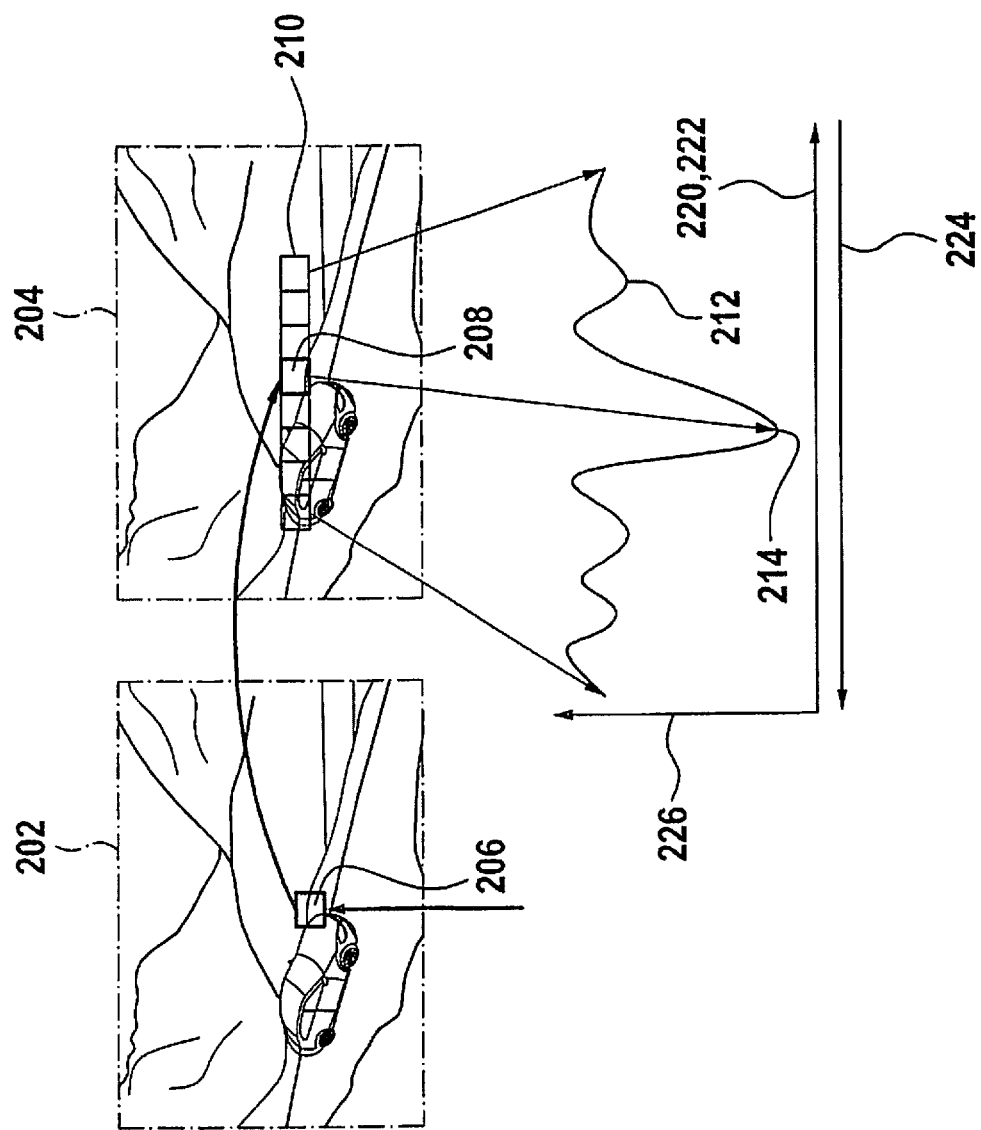
FIG. 2 shows an illustration for explaining the determination of the disparity of the depth distance between the camera and the object according to one exemplary embodiment.

FIG. 2 shows an illustration for explaining the determination of the disparity of the depth distance between the camera and the object according to one exemplary embodiment.

The illustration shows a first left image 202 (for example of the first camera 102 from FIG. 1 situated on the left) and a second right image 204 (for example of the second camera 104 from FIG. 1 situated on the right). Both images show a vehicle driving on a road. The second image 204 is shown in a rectified manner. The first image 202 on the left shows a subsection 206, which sought in the second image 204 on the basis of an epipolar line 210 (for example of an identical column in the right image 204). From these two subsections of the images, a cost function 212 is formed, which is represented in the lower partial diagram from FIG. 2 in a coordinate system. The x axis 220 of the coordinate system represents a rising disparity value 222, which with rising values indicates a falling distance value 224, that is, which behaves reciprocally with respect to distance value 224, which rises in the direction of the arrow. The y axis 226 indicates a cost value at cost function 212 at the respectively associated disparity value. The costs are obtained normally from individual costs per image element (pixel), which are aggregated in a suitable manner over a region in the image (e.g. by summation). These costs are a measure for the similarity of an image region in the reference image and in the search image. The costs per pixel typically result from a similarity measure of the image intensities directly (absolute differences, difference square), the intensity gradients or additional parametric (product-moment correlation) and non-parametric masses (e.g. rank correlation) or combinations thereof. In a local method, these pixel costs are aggregated for example by summing the individual costs in a region of the image. This region may be constant over all calculations or may also be adapted dynamically to the respective image content.

Generally, it may be said that it is irrelevant in which direction the cost function is run through. However, it is of particular interest, for example, that, if possible, it is run through only once for calculating the extreme values.

It is possible to use different methods for determining the distance from one image pair. Frequently, local methods are used that in principle search for a small subsection 206 of the first image 202 in a second rectified image 204 along the epipolar line 210. The similarity of first section 206 with subsection 208 of second image 204 along the epipolar line 210 is represented as cost function 212. The extreme value 214, here minimum 214, of cost function 212 represents the disparity, that is, for example the offset of the identical image content, between first image 202 and second image 204. This disparity is a reciprocal measure for the distance of the object from the camera. The form of the cost function 212, for example the value of minimum 214, the distance of the two maxima from one another, the width of the curve around minimum 214, may be used for evaluating the quality of the disparity.

If the disparities of all subsections 206 of first image 202 with the content of second image 204 are determined, it is possible to generate a disparity map and thus a depth map for the entire image. Additional methods may be applied to this depth map in order to detect for example the surface or the position of objects, for example road surface, pedestrians or vehicles. In driver assistance systems, such as driver assistance system 110, the erroneous detection of objects could result in wrong and dangerous driving maneuvers, for example, an emergency braking operation or an evasive maneuver.

The cost function 212 has in the ideal case a clearly detectable global minimum 214 that has a steep ascent. Additional possible local minima lie with their costs above the costs of global minimum 214. The position of global minimum 214 is the sought after disparity value. This ideal case, however, occurs only in ideal surrounding conditions. In the case of real surroundings, the most varied effects occur, which have a negative effect on the curve of cost function 214. The effect of a "violation of the frontoparallelity" is investigated more closely here.

Figure 3:
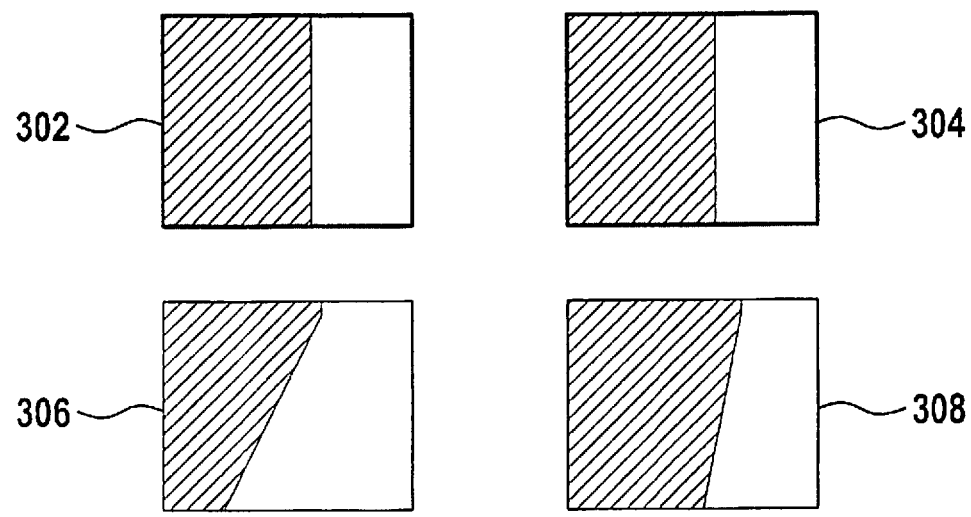
FIG. 3 shows a detail view of image sections of images of the different cameras while maintaining frontoparallelity and a violation of the frontoparallelity.

FIG. 3 shows a detail view of image sections of images of the different cameras while maintaining frontoparallelity and a violation of the frontoparallelity.

The representation shows four rectangles 302, 304, 306, 308, the two upper framed rectangles 302, 304 representing two subsections of a house 106 from FIG. 1 and the two lower framed rectangles 306, 308 showing two subsections of a road or a path 108 from FIG. 1. In the two subsections of the house 302, 304, the frontoparallelity is maintained (that is, the object is essentially frontoparallel with respect to the image recording plane of the camera of stereo camera system 100, whereas in the two subsections 306, 308 of the road or path 106, the frontoparallelity is violated.

In the disparity calculation, a subsection 302 of the first image is compared to subsections 304 along a line of the second image. In the region of the greatest conformity, when frontoparallelity is fulfilled, it is determined that the content of subsections 302, 304 is identical. When the frontoparallelity is violated, the image contents of subsections 306, 308 are also sheared with respect to each other or the inclinations of edges detected in the subsections differ. The quality of the correlation of subsections 306, 308 is therefore clearly lower. This fact become noticeable in the curve of the cost function.

In particular in the area of roadway markings there may be marked changes in the cost curve. Especially the position of the global minimum shifts easily to higher values of disparity, that is, the roadway markings appear too close. In driver assistance systems, this is problematic in that the false disparity of the roadway markings may result in a virtually elongated obstacle. Under no circumstances, however, must the assistance system react to this virtual obstacle.

One aspect to the present invention presented here may now be seen in the provision of a method for evaluating the cost function in order to calculate an additional quality measure, which indicates or represents a measure for the frontoparallelity in the disparity curve. Using the quality measure, it is possible to determine the plausibility of the global minimum, that is, the disparity value.

Figure 4:
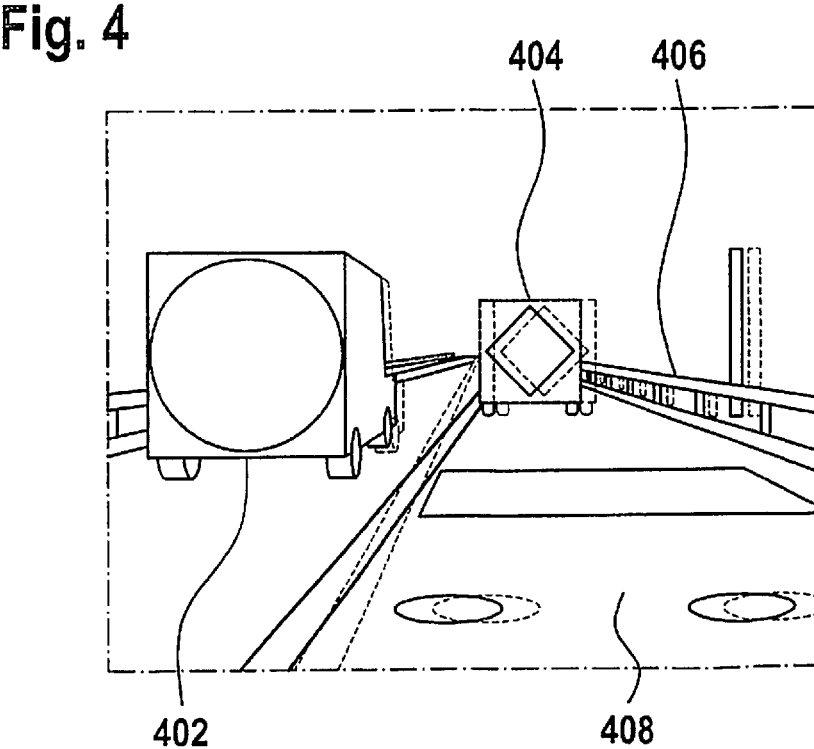
FIG. 4 shows a representation of an overlap of a left and a right camera image of a stereo camera system for applying a method according to one exemplary embodiment.

FIG. 4 shows a representation of an overlap of a left and a right camera image of a stereo camera system for applying a method according to one exemplary embodiment.

The disparity calculation of stereo cameras is typically based on the assumption of frontoparallelity. Objects should stand perpendicular to the direction of view of cameras 102 and 104, respectively, like the rear side of the left truck 402 and of the right truck 404. In this case, by a suitable superposition of the respective subsections of the first left and of the second right image, it is possible to bring the frontoparallel objects into full congruence, which is the case for the rear side of left truck 402. This is likewise possible, however, for the rear side of right truck 404. In non-frontoparallel objects, it is not possible to bring the objects into congruence by superposition of the respective subsection of the first left and the second right image. This fact becomes clear particularly when looking at the side wall of the left truck 402, the guardrail 406 and especially the road 408 or its center marking. Rather, here a shearing of the respective subsections of the images may be seen.

Figure 5A:
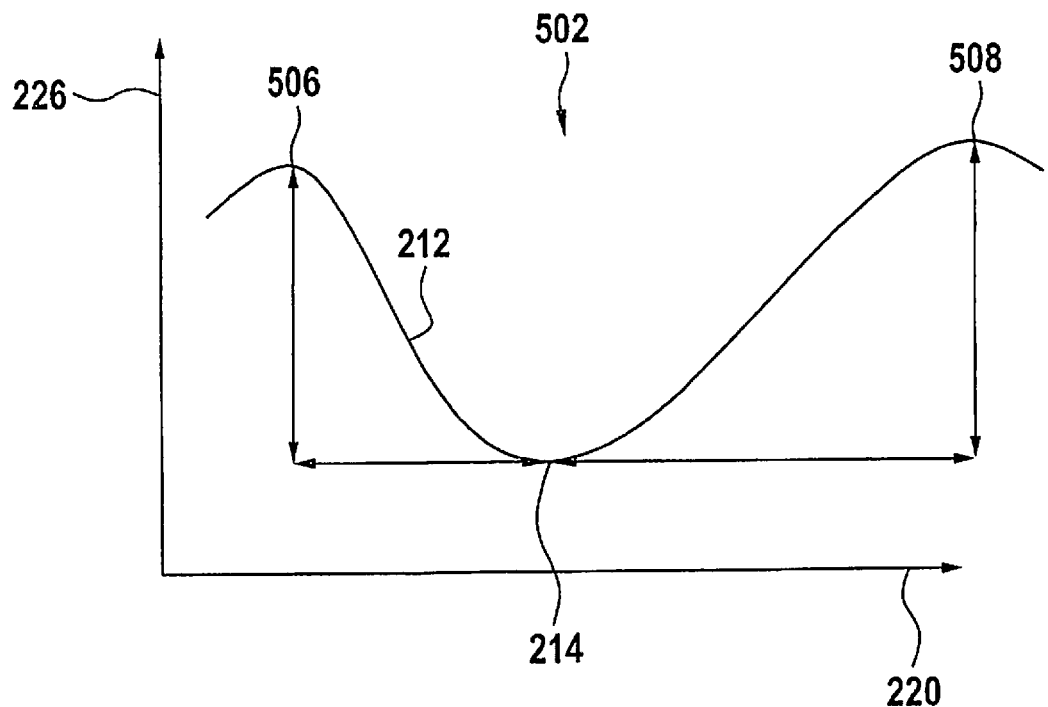
FIGS. 5A and 5B show diagrams of a first cost function in roadway lines when frontoparallelity is violated (FIG. 5A) and of a second cost function in the case of frontoparallel objects (FIG. 5B) according to one exemplary embodiment.
Figure 5B:
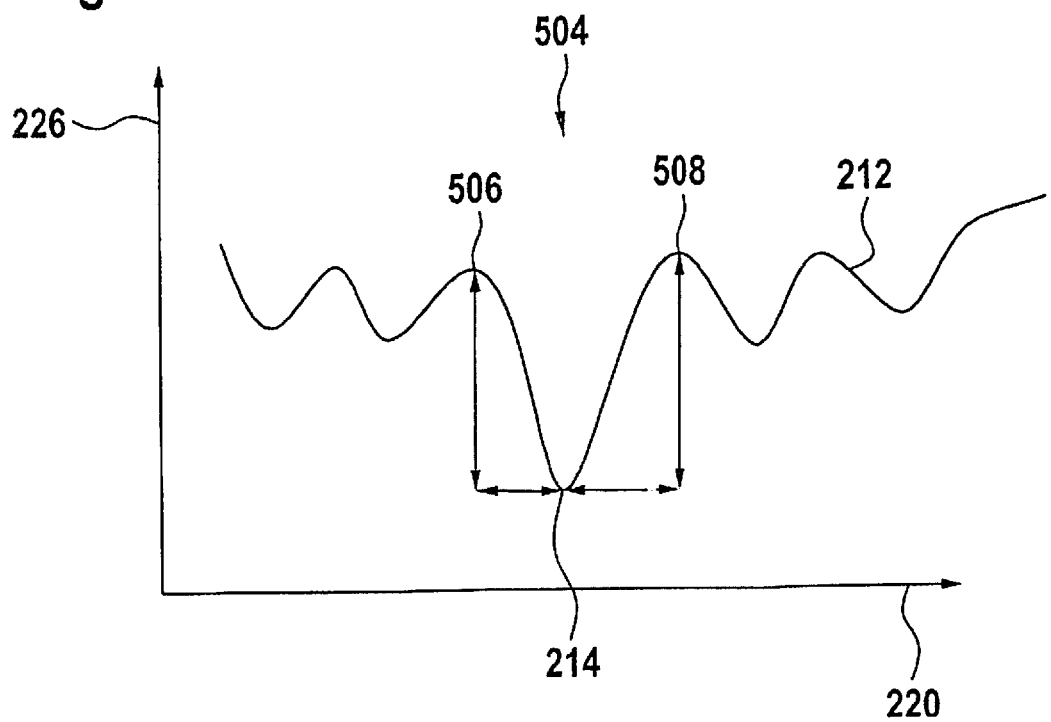

FIGS. 5A and 5B show diagrams or coordinate systems of a first cost function 212 in roadway lines (FIG. 5A) and a second cost function 212 in frontoparallel objects (FIG. 5B) according to one exemplary embodiment.

The representation in FIG. 5A shows a coordinate system 502 of a cost function 212 in the region of subsections in guardrails or roadway markings in objects where frontoparallelity is violated, it being possible to see here an elongated line structure of the cost function 212. The representation in FIG. 5B shows a coordinate system 504 with a cost function 212 in the region of subsections of objects having a good disparity, i.e., in which the criterion of frontoparallelity is nearly fulfilled. In both coordinate systems 502, 504, the x axis 220 represents a rising disparity value 222 and the y axis 226 represents a value of the cost function.

Empirical investigations of a cost function when frontoparallelity is fulfilled and of a cost function when frontoparallelity is violated show clear differences. Thus, in the cost function 504 in the diagram in FIG. 5B, the frontoparallelity is nearly fulfilled. The position of global minimum 214 and thus the disparity value is at the correct location, i.e., at the location that corresponds to reality, and thus represents a good measure for the reciprocal distance. Furthermore, there is a narrow and steep curve of the cost function 212 at the minimum. The noise values (which may be recognized for example by the waviness to the left and the right of the global minimum of the cost function) are nearly constant and clearly greater than the global minimum 214.

In the cost function 502 in the diagram of FIG. 5A, the frontoparallelity is violated. The position of the global minimum 214 and thus the disparity value is mostly shifted to slightly higher values than would correspond to reality. The distance is therefore underestimated. At the global minimum 214, cost function 502 has a flat and wide curve. The noise values nearly disappear in the falling curve of global minimum 214. The left and right local maxima 506, 508 are far apart from each other and from global minimum 214. The cost difference between minimum 214 and the two maxima 506, 508 is accordingly greater.

Figure 6:
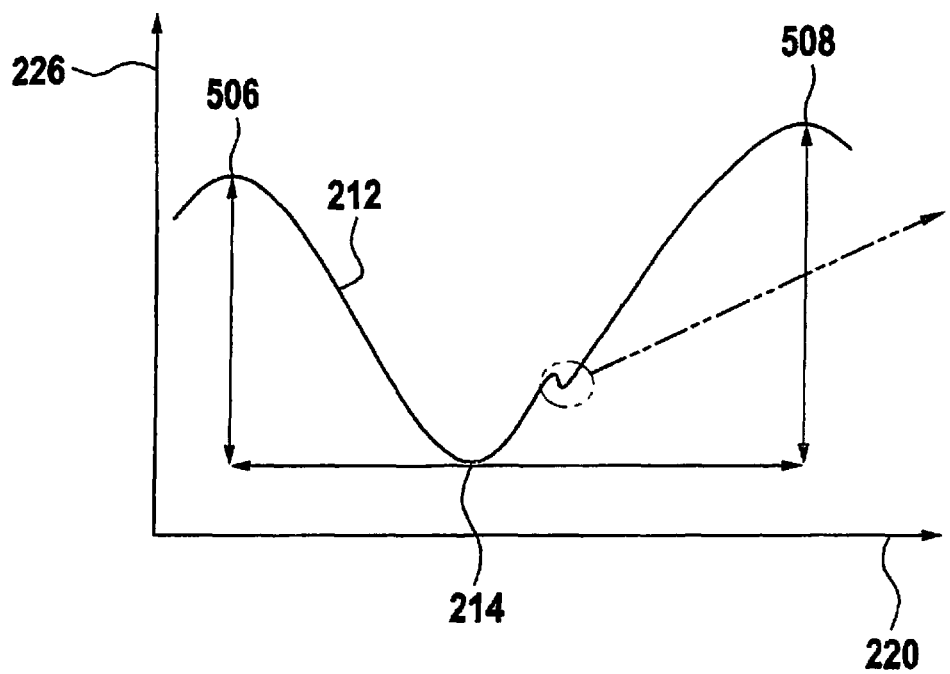
FIG. 6 shows a diagram for describing an algorithm for detecting the frontoparallelity according to one exemplary embodiment.

FIG. 6 shows a diagram for describing an algorithm for detecting the frontoparallelity according to one exemplary embodiment. The representation of the approach from FIG. 6 represents a supplement, in which the next local maximum is not necessarily used. "Small" local maxima, where there are only a few pixels between the local minimum and the local maximum, may be ignored in order to stabilize the method. Rather, the local maximum 508 on the right should be chosen.

The representation shows a coordinate system or a diagram of a cost function 212, an elongated line structure of the cost function 212 being visible here. The x axis 220 shows a rising disparity value 222, and the y axis 226 represents a cost value. It may therefore be assumed that in this cost function 212 the frontoparallelity is violated.

From the effect that in the event of a violation of the frontoparallelity, the left and right local maxima 506, 508 are further away from the global minimum 214, it may be deduced that the local minimum to the left and right of the global minimum 214 is able to be ascertained in a precise and robust manner. From the effect that the cost difference between the minimum and the two maximum is greater in the event of a violation of frontoparallelity, it may be deduced that the associated cost difference is able to be ascertained in a robust and clearly interpretable manner.

First, the global minimum 214 is to be sought. Further, the next maximum 506 prior to the global minimum 214 is to be sought. Finally, the next maximum 508 after the absolute minimum 214 is to be sought. A particular advantage of the method is that in one run-through, for example from left to right, it is possible to determine all variables or maxima and minima and that the curve does not have to be run through multiple times.

The steps of the method for controlling a driver assistance system by using a stereo camera system having a first and a second camera may be advantageously combined with one another in an algorithmic manner so that it is possible to determine all sought-after variables in a single run-through of the cost function 212 from left to right. Additionally, to reduce noise, it is possible algorithmically to ignore adjacent local minima or maxima, which are for example only a few pixels removed from one another (as is shown in FIG. 6).

In summary, it should be noted that empirical investigations of the cost function when the frontoparallelity is fulfilled and when it is violated show clear differences.

When the frontoparallelity is fulfilled, as is shown for example in FIG. 5B, the following applies:

The position of the global minimum and thus the disparity value is at the correct location and thus represents a good measure for the reciprocal distance.

Narrow and steep curve of the cost function at the minimum.

The noise values are nearly constant and clearly greater than the global minimum.

When the frontoparallelity is violated, as is shown for example in FIG. 5A, the following applies:

The position of the global minimum and thus the disparity value is usually shifted slightly to higher values. The distance is therefore underestimated.

The cost function has a flat curve at the global minimum (theorem 1).

The cost function has a wide curve at the global minimum.

The noise values nearly disappear in the falling curve of the global minimum.

The left and right local maxima are far apart from the global minimum (theorem 2).

The cost difference between the minimum and the two maxima greater (theorem 3).

It is possible to deduce measures for the frontoparallelity from the empirical considerations:

It follows from theorem 2: The local minimum to the left and to the right of the global minimum may be ascertained in a robust and precise manner.

It follows from theorem 3: The associated cost difference may be ascertained in a clearly interpretable manner.

The implementation that was represented and described with reference to FIG. 5 may be realized from theorem 2 and theorem 3.

Furthermore, according to another exemplary embodiment, an extended minima/maxima search may also be performed, in which the following exemplary steps would have to be taken:

Search for the global minimum (indicated by reference numeral 214 or designated as Min).

Search for the next maximum prior to the global minimum (also indicated by reference numeral 506 or designated as MaxFrontLoc).

Search for the next maximum after the global minimum (also indicated by reference numeral 508 or designated as MaxBackLoc).

These steps may be advantageously combined with one another in an algorithmic manner so that it is possible to determine all sought after variables in a single run through of the cost function from left to right.

Additionally, to reduce noise, it is possible algorithmically to ignore adjacent local minima/maxima (e.g.: those that are only a few pixels apart from one another).

Two simple threshold values, for example, suffice to determine a violation of the frontoparallelity:

The two maxima in the disparity direction are far removed: MaxBackLocDisp−MaxFrontLocDisp>MIN_BARRIER_DISP (*)

And the cost difference between the (global) minimum and the two maxima is great: MaxFrontLocCost+MaxBackLocCost−k*MinCost>MIN_BARRIER_COST (*)

In the present case, the factor k may have a value of 2, for example.

Specifically, when both conditions (*) are fulfilled, frontoparallelity has been violated.

The approach provided here has some advantages, about which the following may be mentioned by way of example.

Since the disparity calculation is computationally intensive, preferably simple and fast algorithms are required so as not to increase the computational work further when checking the frontoparallelity. The global minimum is normally ascertained simply when running through the disparity curve from left to right without computationally intensive jumps.

The check of the frontoparallelity may be ascertained when running through the disparity curve from left to right without jumping back.

The check of the frontoparallelity may be determined at the same time as the ascertainment of the two global minima.

Extension: The check of the frontoparallelity may be determined at the same time as the ascertainment of the global minimum and the periodicity check.

The check of the frontoparallelity requires only few calculations and variables.

The check of the frontoparallelity requires only little additional computing time.

The check of the frontoparallelity is suitable for FPGA implementations. On the basis of investigations and already existing Bosch products it was possible successfully to demonstrate that the detection of a violation of the frontoparallelity in images works well.

Only two variables are determined as the measure for the frontoparallelity.

Hence, for these two variables of the frontoparallelity, two threshold values suffice. The threshold value in the scenarios investigated so far are relatively non-problematic.

The calculation of the frontoparallelity may be performed using integers.

It is possible to represent the result of the frontoparallelity ascertainment using one bit. It thus requires only little memory space, may be transmitted quickly and readily evaluated in further functions.

The present invention may be applied in various local methods for disparity estimation, i.e., methods that compare a subsection of the left and the right image and in the process generate a cost function.

The method may also be used in analog fashion when the value of the cost function represents, not the dissimilarity, but the similarity of the subsections and thus the sought after disparity value is not the global minimum, but the global maximum.

When applying the method to a stereo camera system for road scenarios, violations of the frontoparallelity in the case of roadway markings and also guardrails are readily detected. The method is thus also suitable for identifying the position of roadway markings and guardrails.

The method is also suitable generally for detecting the frontoparallelity of objects in stereo systems and is not limited to cameras for driver assistance systems.

Figure 7:
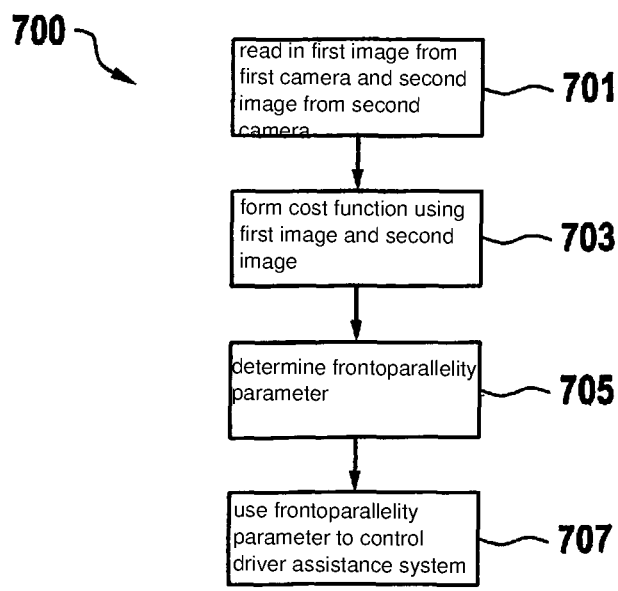
FIG. 7 shows a flow chart of an exemplary embodiment of a method for controlling a driver assistance system using a stereo camera system having a first and a second camera.

FIG. 7 shows a flow chart of an exemplary embodiment of a method 700 for controlling a driver assistance system using a stereo camera system having a first and a second camera.

In a step 701 of reading in, a first image is read in from the first camera and a second image is read in from the second camera. In a step 703 of forming, a cost function is formed by using the first and the second image. In a step 705 of determining, a frontoparallelity parameter representing the frontoparallelity of an object with respect to the stereo camera system is determined by using a global minimum of the cost function. Finally, in a step 707 of using, the frontoparallelity parameter is used to control the driver assistance system.

According to one exemplary embodiment, two simple threshold values suffice to determine a violation of the frontoparallelity. The first threshold value is calculated from the difference of the disparity parameters that are associated with the maxima, this difference being greater than a disparity parameter threshold value. The second threshold value is formed from the cost function comparison value, which is calculated by the sum of the cost function value of each of the maxima minus a k-fold value, in particular twice the value, of the cost function at the global minimum.

If an exemplary embodiment includes an "and/or" linkage between a first feature and a second feature, this is to be understood to mean that the exemplary embodiment according to one specific embodiment has both the first feature and the second feature, and according to another specific embodiment, either has only the first feature or only the second feature.

What is claimed is:

1. A method for controlling a driver assistance system using a stereo camera system having a first and a second camera, the method comprising:
   reading in a first image from the first camera and a second image from the second camera;
   forming a cost function by using the first image and the second image;
   determining a frontoparallelity parameter representing a frontoparallelity of an object with respect to the stereo camera system by using a global minimum of the cost function; and
   using the frontoparallelity parameter for controlling the driver assistance system;
   wherein, in the determining step, the frontoparallelity parameter is formed as a bit value.

2. The method as recited in claim 1, wherein, in the forming step, a subsection of the first camera image is compared to at least one further subsection of the second camera image, wherein at least one of: (i) in a row of the first camera image is compared to a row of the second camera image, and/or (ii) a column of the first camera image is compared to a column of the second camera image.

3. The method as recited in claim 1, wherein, in the determining step, the cost function is determined as a function of a disparity parameter representing a distance of the object from the stereo camera system.

4. A method for controlling a driver assistance system using a stereo camera system having a first and a second camera, the method comprising:
   reading in a first image from the first camera and a second image from the second camera;
   forming a cost function by using the first image and the second image;
   determining a frontoparallelity parameter representing a frontoparallelity of an object with respect to the stereo camera system by using a global minimum of the cost function; and
   using the frontoparallelity parameter for controlling the driver assistance system;
   wherein, in the determining step, the cost function is determined as a function of a disparity parameter representing a distance of the object from the stereo camera system, and
   wherein, in the determining step, the disparity parameter is used, which represents a reciprocal measure of the distance of the object from the stereo camera system.

5. A method for controlling a driver assistance system using a stereo camera system having a first and a second camera, the method comprising:
   reading in a first image from the first camera and a second image from the second camera;
   forming a cost function by using the first image and the second image;
   determining a frontoparallelity parameter representing a frontoparallelity of an object with respect to the stereo camera system by using a global minimum of the cost function; and
   using the frontoparallelity parameter for controlling the driver assistance system;
   wherein, in the determining step, the cost function is determined as a function of a disparity parameter representing a distance of the object from the stereo camera system, and
   wherein, in the determining step, at least two maxima of the cost function are determined, a disparity parameter associated with the global minimum lying between disparity parameters that are associated with the two maxima.

6. The method as recited in claim 5, wherein, in the determining step, a difference of the disparity parameters, which are associated with the maxima, is greater than a disparity parameter threshold value.

7. The method as recited in claim 5, wherein, in the determining step, a cost function comparison value, which is formed by combining the cost function at the global minimum and at least one of the maxima, is greater than a cost function threshold value.

8. The method as recited in claim 7, wherein, in the determining step, the cost function comparison value is formed by a sum of a cost function value of each of the maxima minus a value dependent on the value of the cost function at the global minimum.

9. The method as recited in claim 5, wherein, in the determining step, the frontoparallelity parameter is formed as a bit value.

10. A method for controlling a driver assistance system using a stereo camera system having a first and a second camera, the method comprising:
    reading in a first image from the first camera and a second image from the second camera;
    forming a cost function by using the first image and the second image;
    determining a frontoparallelity parameter representing a frontoparallelity of an object with respect to the stereo camera system by using a global minimum of the cost function; and
    using the frontoparallelity parameter for controlling the driver assistance system;
    wherein, in the determining step, at least the global minimum of the cost function is determined by a single run through in a determination of cost function values in a direction of rising or falling disparity values.

11. An apparatus for controlling a driver assistance system using a stereo camera system having a first and a second camera, comprising:
    a device configured to perform the following:
        reading in a first image from the first camera and a second image from the second camera;
        forming a cost function by using the first image and the second image;
        determining a frontoparallelity parameter representing a frontoparallelity of an object with respect to the stereo camera system by using a global minimum of the cost function; and
        using the frontoparallelity parameter for controlling the driver assistance system;
        wherein, in the determining step, the frontoparallelity parameter is formed as a bit value.

12. A non-transitory machine-readable storage medium on which is stored a computer program, which is executable by a processor, comprising:
    a program code arrangement having program code for controlling a driver assistance system using a stereo camera system having a first and a second camera, by performing the following:
        reading in a first image from the first camera and a second image from the second camera;
        forming a cost function by using the first image and the second image;
        determining a frontoparallelity parameter representing a frontoparallelity of an object with respect to the stereo camera system by using a global minimum of the cost function; and
        using the frontoparallelity parameter for controlling the driver assistance system;
        wherein, in the determining step, the frontoparallelity parameter is formed as a bit value.

* * * * *